Figure 1:
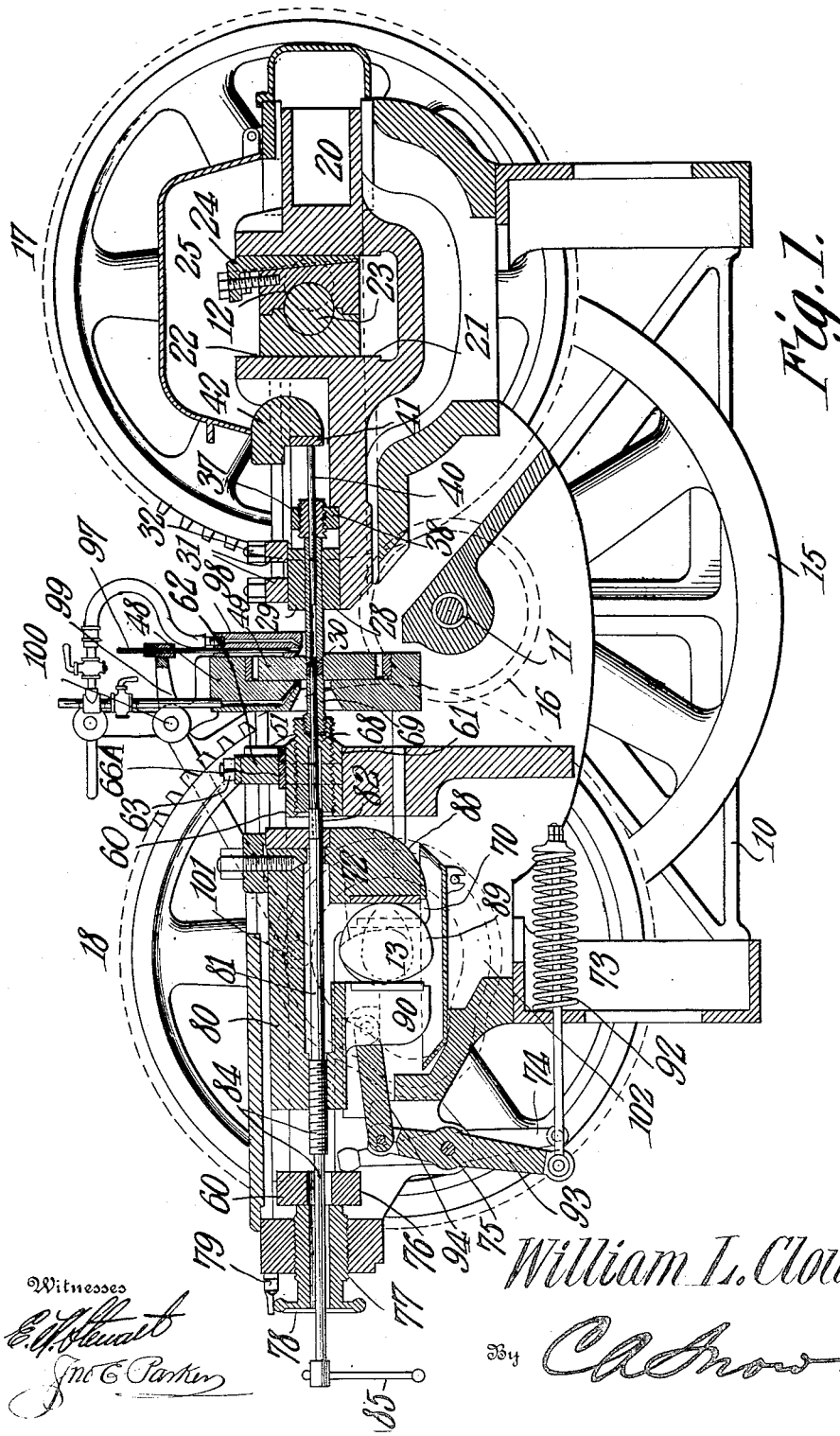

W. L. CLOUSE.
NUT MAKING MACHINE.
APPLICATION FILED SEPT. 23, 1908.

943,768.

Patented Dec. 21, 1909.
4 SHEETS—SHEET 1.

Witnesses

Inventor
William L. Clouse,
By
Attorneys

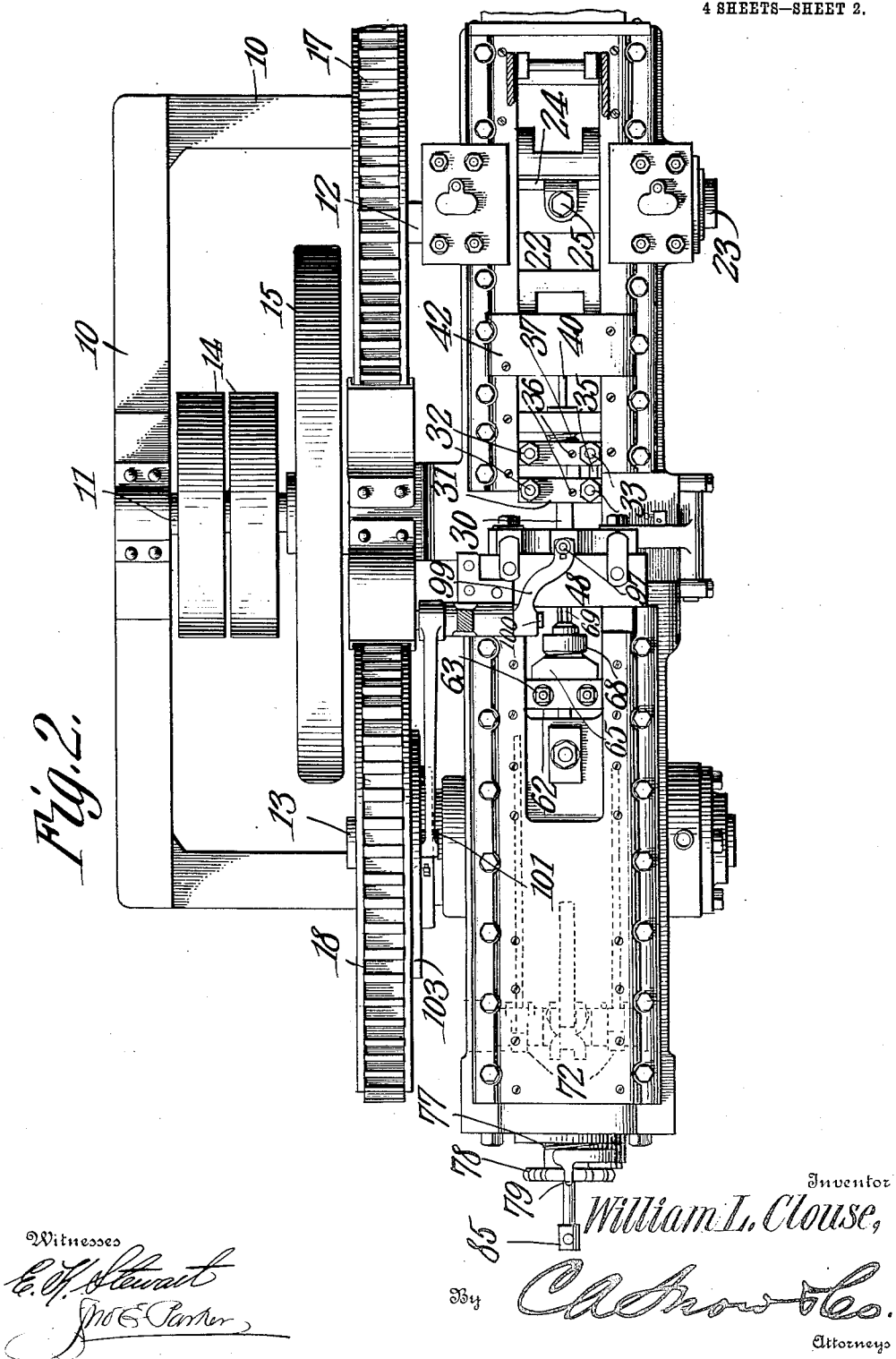

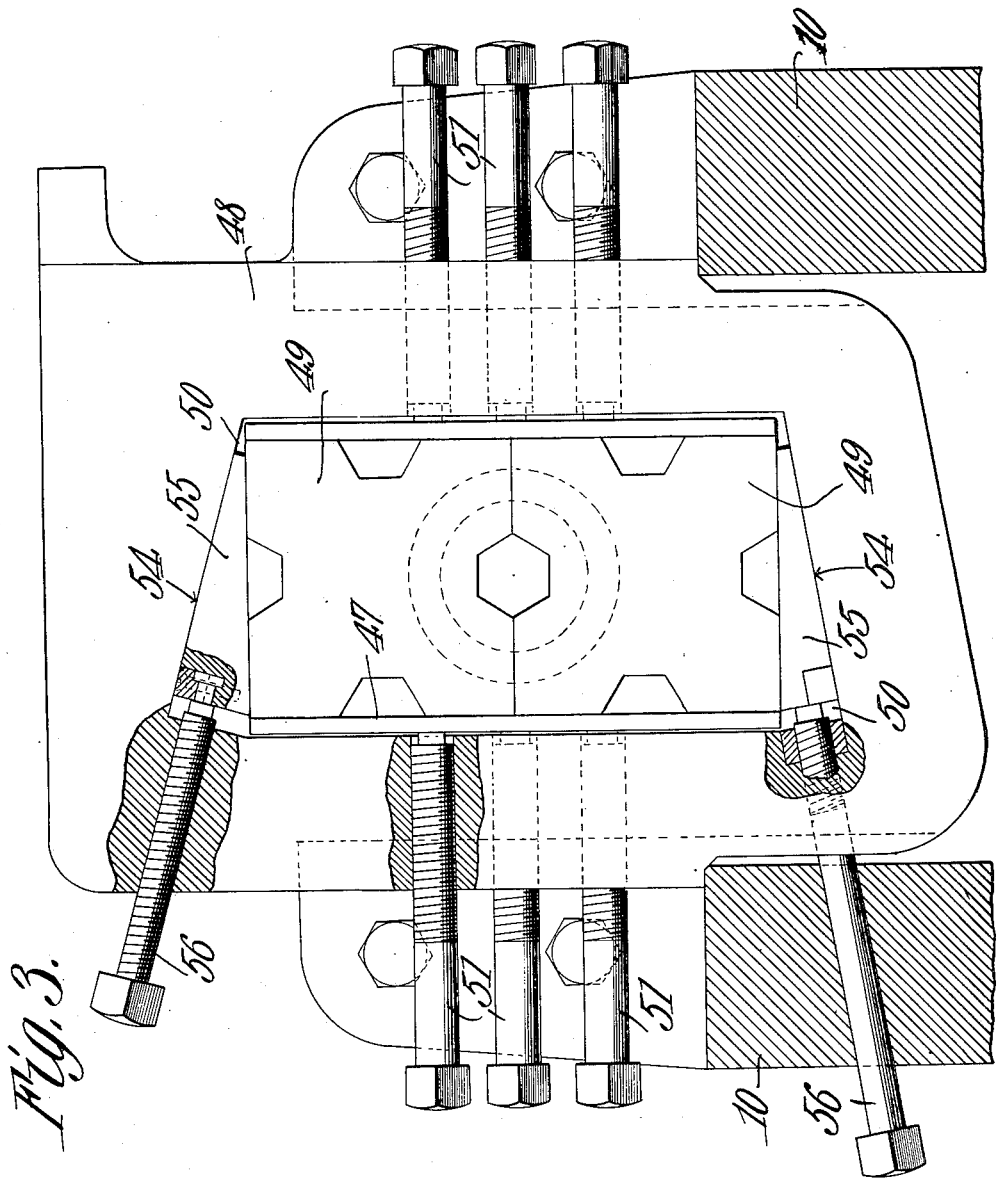

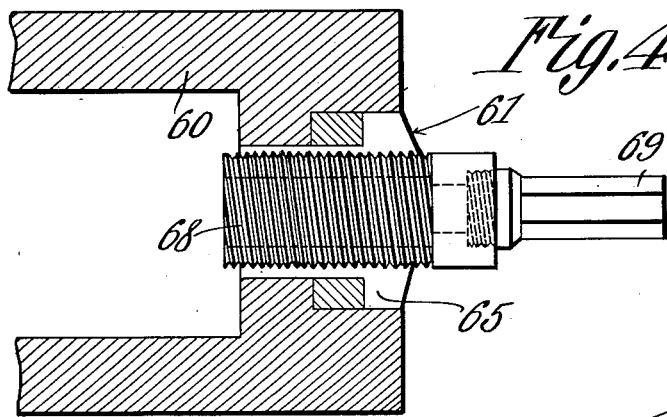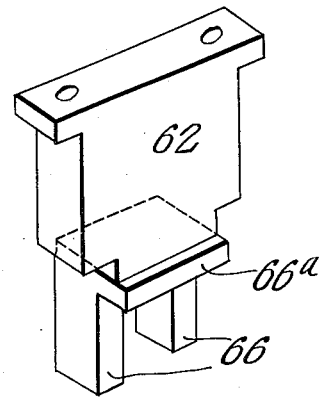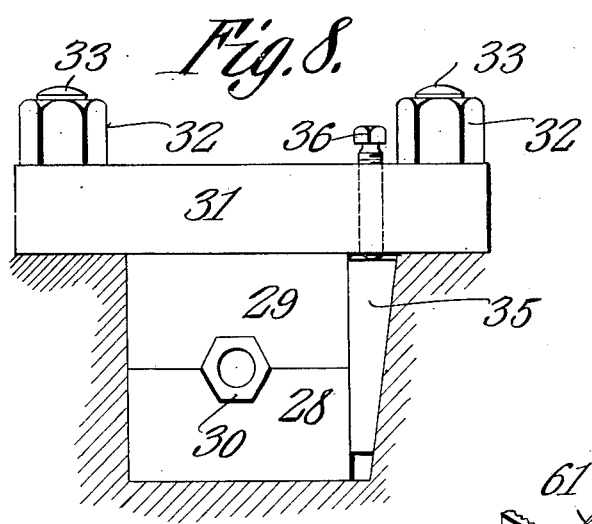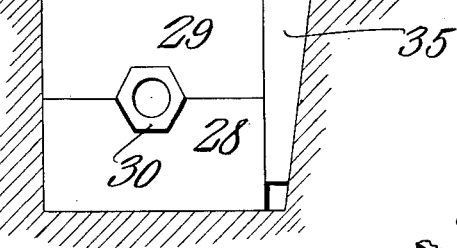

UNITED STATES PATENT OFFICE.

WILLIAM L. CLOUSE, OF TIFFIN, OHIO, ASSIGNOR TO THE NATIONAL MACHINERY COMPANY, OF TIFFIN, OHIO.

NUT-MAKING MACHINE.

943,768.     Specification of Letters Patent.     Patented Dec. 21, 1909.

Application filed September 23, 1908. Serial No. 454,311.

*To all whom it may concern:*

Be it known that I, WILLIAM L. CLOUSE, a citizen of the United States, residing at Tiffin, in the county of Seneca and State of Ohio, have invented a new and useful Nut-Making Machine, of which the following is a specification.

This invention relates to machines employed for the manufacture of hot pressed nuts.

In machines of this class the female die is formed in sections, and during the process of manufacture of the nut these sections are subjected to enormous strain tending to force them apart, the strain occurring at different points in the width of the dies in accordance with the temperature of the heated bar from which the nut is punched; the character of the metal; the thickness of the nut, and the degree of compression exerted by the crowner in shaping the head of the nut. The greatest strain will occur at one time at the forward or entrance end of the die, and at other times near the rear end thereof and up to the present time no satisfactory means has been employed for forming a backing for the entire die surface, and at the same time permitting the necessary close adjustment which machines of this class require.

One of the principal objects of the invention is to overcome this difficulty and provide a rigid backing and support for the die sections, such backing and support covering the entire area exposed to pressure, and being at the same time of such construction as to permit close adjustment as may be required from time to time to compensate for wear or where new dies are substituted for old ones.

A further object of the invention is to provide a novel form of clamp and adjusting device for the male die.

A still further object of the invention is to improve and simplify the construction of the male die carrier and its operating means and to provide for the adjustment of the parts in case of wear.

A still further object of the invention is to provide an improved mounting for the crowner and to so arrange the same that the crowner may be readily removed from the machine when necessary without disturbing the main female die.

A still further object of the invention is to provide an improved carrying and operating means for the piercer, and further to simplify and improve the construction of the piercer and crowner actuating means.

A still further object of the invention is to provide means for positively discharging or "picking off" the finished nut after the latter has been forced from the female die by the crowner.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional elevation of a nut machine constructed in accordance with the invention. Fig. 2 is a plan view of the same. Fig. 3 is a face view of the female die and its carrying and adjusting mechanism. Fig. 4 is a sectional plan view of the crowner clamp or carrier. Fig. 5 is a perspective view of a portion of the same. Fig. 6 is a detail perspective view of one of the sections of the crowner carrying clamp. Fig. 7 is a similar view of the locking key. Fig. 8 is an elevation of the male die clamping and adjusting means.

Similar numerals of reference are employed to indicate corresponding parts throughout the several figures of the drawings.

The working parts of the machine are mounted in a massive frame 10 that is provided with bearings for the support of three shafts 11, 12 and 13, the shaft 11 being provided at one side of the machine with fast and loose pulleys 14, and a fly wheel 15. This shaft, also, carries a pinion 16 that intermeshes with two gears 17 and 18 carried by the shafts 12 and 13, respectively.

At one end of the frame are arranged guides for the reception of a horizontally reciprocatory slide 20 that is provided with vertical guideways 21 for the reception of a pair of bearing blocks 22 that receive a crank pin 23 carried by the shaft 12. As the shaft is rotated, the crank pin is carried around, and the bearing blocks reciprocate vertically in the guides 21 and impart movement to the main slide 20. In order to compensate for wear of the blocks and guides, a wedge block 24 is arranged to reciprocate with the bearing blocks and is connected to one of them by a screw 25 which may be turned for the purpose of adjusting the wedge and thus compensating for wear.

At the front end of the slide are arranged two clamp blocks 28 and 29 for the reception of the male die 30, and these blocks are firmly clamped in place by a pair of cross bars 31 that are secured in place by nuts 32 screwing on vertical bolts 33 carried by the main body of the slide. The clamp blocks are further held in place and laterally adjusted by means of a wedge block 35 that extends between one end of the blocks and the adjacent side wall of the recess in which said blocks are arranged, and this wedge may be adjusted by screws 36 extending through threaded openings formed in the upper clamp bars 31.

The male die 30 is of hexagonal or other contour in accordance with the shape of the nut to be formed, and its rear end abuts against a hollow set screw 37 passing through a threaded block 38 that is carried by the main slide. By turning this screw the die may be adjusted in the direction of its length for the purpose of altering the thickness of the nuts to be made.

Extending through the hollow set screw and into the bore of the male die is an ejector rod 40 the rear end of which abuts against a wear plate 41 that is carried by a cross bar 42 secured to or forming a part of the fixed frame of the machine. The function of the ejector is to push out the punchings or wads of metal which are forced into the bore of the male die by the piercer in the formation of the central opening of the nut.

The central portion of the frame of the machine is provided with a cross bar 48 having a recess 50 in which are arranged the two sections 49 of the female die, the die opening being of a contour corresponding to that of the male die 30. Arranged in the recess at the sides of the die sections 49 are wear plates 47 which are engaged by set screws 51, said screws serving to properly center and adjust the die sections laterally of the machine, while the screws afford the necessary support and backing to resist the working strain. The central screws form backings for both of the die sections, while the upper screws bear against the upper section, and the lower screws against the lower section. The line of division of the sections, however, is horizontal, and the lateral strain does not tend to separate the die sections, so that the screws have ample backing at these points.

The principal strain to be taken care of is the vertical strain that tends to separate the two sections of the die, and it is found in practice that screws will not satisfactorily accomplish this result owing to the fact that they cannot form a backing for the entire surface of the die sections, and, further, that it is almost impossible to adjust a plurality of screws to precisely the same point, so that the resistance offered to movement of the die by one screw may be greater or less than that offered by the remaining screw or screws, and in such case the die sections would be moved from place.

In carrying out the present invention the upper and lower walls of the recess 50 are arranged on oblique lines, as illustrated in Fig. 3, and fitting between these oblique walls and the horizontal faces of the die sections are wedges 55 that fit solidly in the spaces. The larger ends of these wedges are engaged by set screws 56 tapped in openings in the cross bar 48. These screws may be adjusted for the purpose of moving the wedges and the latter will form backings for the entire upper and lower surfaces of the die sections and will offer uniform resistance throughout the entire surface areas, so that the die sections will be held firmly together. The employment of the wedges moreover permits adjustment to compensate for wear, and will, also, permit the employment of other dies of different size in accordance with the size of the nut to be made.

At the end of the main frame adjacent the large gear 18 is a slidably mounted crowner carriage 60, provided at one end with a rectangular split box 61 held in place by a cross bar 62 that is fastened down by bolts 63. The two vertical edges at each side of this box are provided with lips 65 at the rearward of which are spacing keys 66. These spacing keys serve to transmit the strain from the block 61 to slide 60. These two spacing keys 66 are connected by the cross bar 66$^A$ so that they are removed and replaced at one and the same time. The cross bar 62 bears on the bar 66$^A$ thereby holding the keys in place, and clamping the box 61 and the crowner holder 68. When the cross bar 62 is removed the keys 66 can be taken out and the block 61 slid back thus permitting the removal of the crowner as hereinafter described.

The box is internally threaded for the reception of the threaded chuck 68, the inner end of which is bored and shaped for the reception of the threaded rear end of a crowner 69, this crowner corresponding in cross sectional contour to the male die 30 and serving in connection with the male die to press the nut into shape and to hold the nut during the piercing operation.

It will be observed that the crowner extends for a short distance into the female die, and if the locking key 66 is removed and the crowner holding block is allowed to move outward, the end of the crowner may be drawn out of the die and then detached for the purpose of inserting a new crowner when necessary, and this operation may be accomplished without disturbing the adjustment of the female die sections.

The slide or carriage 60 is provided with two depending lugs 70 as shown by dotted lines in Fig. 1, and these are arranged to be engaged by cams on the shaft 13. As the shaft rotates, the lugs will be engaged by the cams and the crowner will be forced forward into the die. The reverse movement is accomplished by springs 73 which are connected to the lower ends of a pair of levers 74 fulcrumed on a stationary pin 75, the upper ends of these levers engaging against a cross bar 76 that forms the rear part of the slide 60. This cross bar is engaged by a set screw 77 that screws into a threaded opening formed in the main frame, and the outer end of the set screw is provided with an operating handle 78 that is provided with peripheral notches for the reception of a locking pawl 79 pivoted to the frame, the pawl serving to hold the screw in any position to which it may be adjusted.

Mounted slidably in the carriage 60 is a second carriage 80 which is provided with a threaded sleeve 81 in which the piercer die 82 is threaded. This sleeve or the bar 84 is clamped in the forward end of sleeve 80 by means of a toe clamp. The rearward end of bar 84 extends as a stem through the central passage of the screw 77 and is provided at its outer end with a handle 85. The bar 84 thus acts both to transmit the strain from the piercing tool 82 to the slide 80 and to pull the piercing tool 82 out of the nut. This secondary carriage 80 has one or more depending ears 72 arranged to be engaged by cams 89 on the shaft 13, and is, also, provided with ears 90 arranged opposite the ears 88 and, also, engaged by the cam, so that both the forward and rearward movement of the piercer may be made positive. In addition to the cam, a spring 92 is employed to assist the retractile movement of the piercer, this spring being connected to a lever 93 that is pivoted on the pin 75 and the upper end of the lever being connected by a link 94 to the piercer slide.

In the operation of the machine as thus far described, a bar of heated metal is held in front of the female die. The main slide 20 is then pushed forward and the male die 30 cuts the nut blank off the bar (the bar is narrower than the nut and the blank is cut clean from the bar and it not punched off) and carries it into the female die and against the crowner. The pressing of the male die 30 against the crowner forms the nut into shape and makes the crown upon the nut, and while held in this way the piercer 82 is thrust forward to punch the central opening in the nut, the punching, or wad of metal, being forced in the central portion of the male die 30. The male die 30 then retracts and the punching, or wad of metal, is carried into engagement with the relatively stationary ejector 40 and is forced out of the male die. The crowner, which during this time has remained stationary against the set screw 77, then moves forward and pushes the nut out of the female die 49.

In order to positively remove the nut from the face of the crowner in case there should be any tendency to stick, a kicker rod 97 is employed, this rod being guided through an opening formed in a small block 98 that is secured to the transverse bar 48. The upper end of the kicker rod is carried by a swiveled nut to which is pivoted one end of a lever 99 fulcrumed on a pin 100, the opposite end of the lever carrying an anti-friction roller 101 that enters a cam groove 102 formed in a cam disk 103 on the shaft 13. Both blocks 48 and 98 are provided with openings forming water ports that are connected to suitable supply pipes in order that jets of water may be directed against both faces of the die for the purpose of keeping down the temperature.

I claim:—

1. In a hot pressed nut machine, a reciprocatory slide, a pair of clamping blocks thereon, a hollow male die between the clamping blocks, a pair of clamping bars engaging the said clamping blocks, a wedge block arranged at one end of the clamping block, and means for adjusting the wedge block.

2. In a hot pressed nut machine, a crowner, a crowner carrying slide, and a filling key between the crowner and slide and removable to permit rearward movement of the crowner from the female die.

3. In a hot pressed nut machine, a frame, a stationary female die, a male die coacting therewith, a crowner slide, a block carried thereby, a clamping bar for the block, a removable filling bar, a key between the block and bar, a crowner chuck adapted to a threaded opening in the block, and a crowner having a threaded connection with said chuck.

4. In a hot pressed nut machine, a sectional die, a recessed carrier therefor having opposite inclined walls, wedges arranged between the inclined walls and the die sections, and of a width not less than the width of the die sections to form a backing for the entire surfaces thereof, and means for adjusting said wedges.

5. In a hot pressed nut machine, a die comprising upper and lower sections, a recessed support for the die, the upper and lower walls of the recess being inclined, wedges arranged between the inclined walls and the adjacent surfaces of the die sections, such wedges being of a width not less than the width of the die sections and forming backings for the entire horizontal surfaces thereof, adjusting screws engaging said wedges, and adjustable side bearing screws extending through the support and engaging the vertical walls of said die sections.

In testimony that I claim the foregoing as my own, I have hereto affixed my signature in the presence of two witnesses.

WILLIAM L. CLOUSE.

Witnesses:
 EARL C. KNAPP,
 WALLER N. CLOUSE.